United States Patent [19]
Kim et al.

[11] Patent Number: 5,457,314
[45] Date of Patent: Oct. 10, 1995

[54] MOUNT FOR POSITIONING A PHOTODETECTOR ON AN OPTICAL APPARATUS

[75] Inventors: Joon-Bae Kim, Kyoungki, Rep. of Korea; Martin J. McCaslin, Pleasanton, Calif.

[73] Assignee: Hyundai Electronics Industries Co., Ltd., Kyoungki, Rep. of Korea

[21] Appl. No.: 199,846

[22] Filed: Feb. 22, 1994

Related U.S. Application Data

[63] Continuation-in-part of Ser. No. 997,968, Dec. 30, 1992, abandoned.

[30] Foreign Application Priority Data

Dec. 31, 1991 [KR] Rep. of Korea ............... 91-25944

[51] Int. Cl.$^6$ .................................................. H01J 5/02
[52] U.S. Cl. ......................................... 250/239; 269/904
[58] Field of Search ....................... 250/239, 216; 269/58, 70, 71, 76, 16, 904; 82/76, 77, 127; 29/37 R, 741

[56] References Cited

U.S. PATENT DOCUMENTS

| 5,111,041 | 5/1992 | Imai | 250/239 |
| 5,115,125 | 5/1992 | Biggs | 250/239 |

Primary Examiner—Edward P. Westin
Attorney, Agent, or Firm—Popham, Haik, Schnobrich & Kaufman, Ltd.

[57] ABSTRACT

A mount for adjusting the position of a photodetector in a fine range is described. The adjustment of the photodetector is carried in one direction or both directions along X and/or Y axis in a condition that the photodetector is fixed on a base plate by fixing the photodetector on the mount of an optical instrument, and is also for fine adjustment of a position of the photodetector by a set screw or a general screw by forming cantilever supporting working points at one or more places of the mount and by installing said set screw at a place opposite to the working points.

5 Claims, 3 Drawing Sheets

MOUNT FOR POSITIONING A PHOTODETECTOR ON AN OPTICAL APPARATUS

This application is continuation in part application of U.S. Ser. No. 07/997,968 filed on Dec. 30, 1992 entitled A MOUNT FOR POSITION ADJUSTING A PHOTODETECTOR which has now been abandoned, the entire contents of which are hereby incorporated by reference.

BACKGROUND OF THE INVENTION

1. Field of the Invention

The present invention relates to a mount for positioning a photodetector on an optical apparatus, and more particularly to a mount for adjusting the position of a photodetector used, for example, in an optical disk drive in X and Y directions in the magnitude of a few micron respectively in order to precisely align the center of a laser beam and the center of the photodetector at the time of or after fixing the photodetector to the body of the optical disk drive. The mount of the present invention can also be used to adjust the position of a photodetector used in the other detectors or sensors which require fine adjustment in X or Y direction or in both the X and Y directions by order of few microns magnitude.

2. Information Disclosure Statement

For conventional methods of adjusting the position of a photodetector of an optical disk drive or a compact disk drive, there are two methods: first, a method of bonding a photodetector directly to a base plate of an optical device with bond after adjusting the photodetector using a special jig, and second, a method of fixing a photodetector to a base plate of an optical device with a set screw after adjusting a position of the photodetector by adjusting a reference plate attached to the photodetector with a special jig.

Because the first adjusting method mentioned above among the conventional methods is to fix the photodetector to the base plate of the optical device by using adhesives, there is a problem of poor thermal stability. That is, when the temperature of the mount and ambient environment rise due to the laser beam used in the optical device, the adhesive strength of the adhesive is weakened and it causes the deformation of the mount regarding the body of the optical device. Once the above condition is occurred, readjustment of the mount is impossible at a later time since the adhesive loses its adhesive strength between the mount and the body of the optical device.

In the other method mentioned above, it is possible to readjust the mount at a later time by using a set screw; however, because a range in which the screw moves is too large in comparison with a range which is required for fine adjustment of the mount within the range of several micron, a precise adjustment is very difficult. Therefore, a precise and special jig is required for precisely adjusting the mount to the body of the optical device in the process of fixing the mount to the body of the device. This nevertheless is an elaborate operation, and increases costs and time for mounting the mount to the body of the optical device.

Therefore, it is desirable to provide a mount or an apparatus which can adjust the photodetector precisely without a special exclusive jig during the operation of fixing the mount to the body of the optical device and readjusting the position of the mount after such fixing operation.

SUMMARY OF THE PRESENT INVENTION

In order to solve the aforementioned problems, the present invention provides a double cantilever type mount for adjusting the position of a photodetector, said cantilever type mount of the present invention having a support plate which supports the photodetector, a carrier which is in the form of a cornered strip and surrounds said support plate, a first neck which interconnects the support plate which carries the photodetector to the inner end of the carrier, and a second neck interconnecting the outer end of the carrier to the base plate of the mount. The carrier is provided with a screw hole formed in a position which is normal to the first neck and is opposite to the second neck of said base plate of the mount, the base plate having a pair of through holes for receiving a pair of screws, and a pair of screws, each of which has a head with the same diameter as the shank of the screw and controls the position of the carrier in the direction parallel to the first neck and second neck, respectively. The base plate of the mount is fixed to the body of the optical device via typical fastening means such as screw, bolt and welding. The positioning of the photodetector can easily be performed through the pair of control screws after the mount is fixed to the body of the optical device. This feature mainly relies upon the inherent function of the double cantilever type mount for the photodetector. In the present invention, the photodetector can be controlled in both X and Y directions by virtue of the pair of control screws being oriented with respect to each other in normal directions. Since the advancement range of the pair of control screws can be controlled very precisely, the position of the photodetector can be controlled within the range of a few micron. This control operation can be performed at the same time or after the base plate of the mount which carries the photodetector is fixed to the optical device.

DETAILED DESCRIPTION OF THE EMBODIMENT

Figure 1:
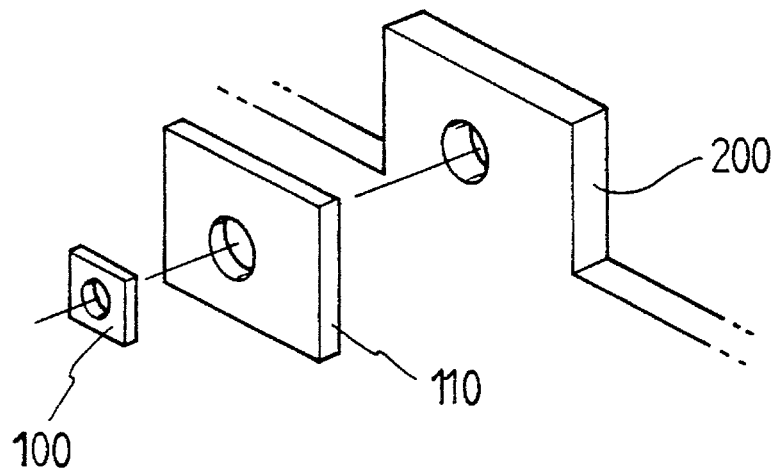
FIG. 1 shows an exploded view of a conventional photodetector in which the photodetector and a mount are aligned with a base plate by a special jig before bonding the photodetector directly to a base plate.

FIG. 1 shows a conventional device for mounting a photodetector 100 to a base plate 200 using a conventional glue material such as bond, resin, etc. The photodetector 100 and a spacer 110 are aligned to the base plate 200 by a special jig (not illustrated in the drawing) and are fixed to the plate 200 thereafter. The structure shown in FIG. 1 has a disadvantage of not withstanding the environment of high temperature as mentioned above.

Figure 2:
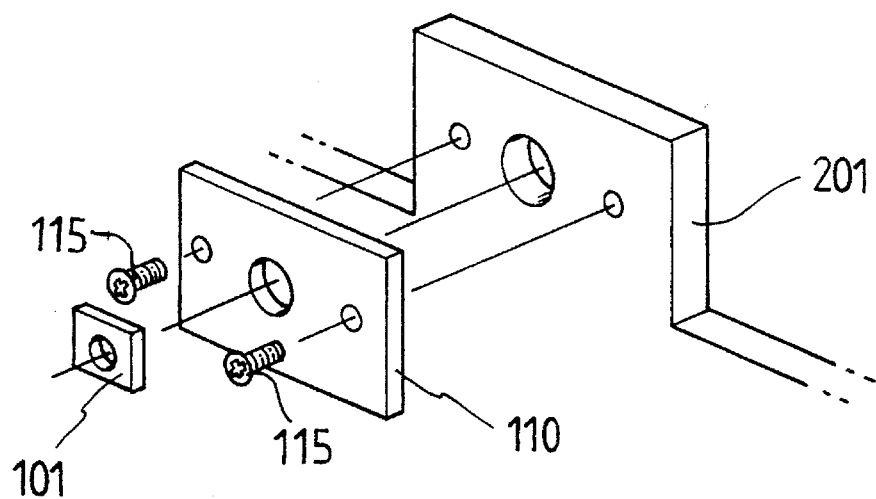
FIG. 2 shows a perspective view, similar to FIG. 2, of an another conventional photodetector in which the photodetector and a mount are aligned with a base plate by a special jig before fixing the photodetector to a base plate with a set screw.

FIG. 2 shows another device according to prior art for mounting a photodetector 101 to a base plate 201 using set screws 115 as illustrated. The photodetector 101 is mounted to the base plate 201 via spacer 110 by set screws 115 after the alignment of the photodetector 101, spacer 110 and base plate 201 have been completed. The structure shown in FIG. 2 has advantage over the device illustrated in FIG. 1 in view of the possibility of readjustment of photodetector 101 by releasing of the set screws 115, moving the photodetector 101 and thereafter refastening the set screws. However, the device illustrated in FIG. 2 has drawbacks of misalignment by the virtue of the inherent clearance of screws as mentioned above. Typically, the nominal clearance of a set screws 115 is relatively larger than the clearance required for a normal optical device, so that the photodetector 101 could not be precisely mounted to the base plate 201 of the optical device in a desired range.

Figure 3:
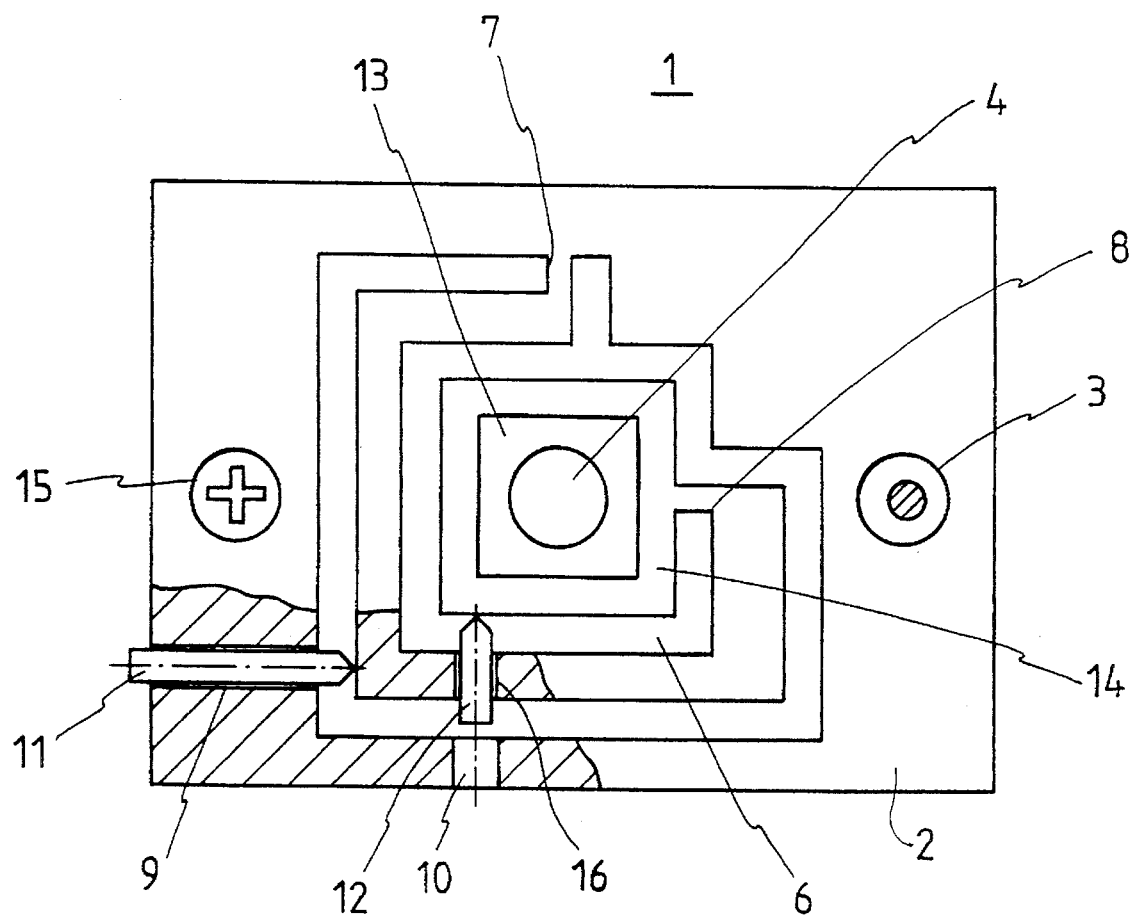
FIG. 3 shows a plan view of a mount for positioning and adjusting the position of the photo-detector according to the present invention.

FIG. 3 shows a front view of a mount 1 for mounting a photodetector according to the present invention. The mount 1 illustrated in the drawing has a base plate 2 formed with a resilient plate having thin thickness and a flat surface. The base plate 2 is provided with, as illustrated in FIG. 3, two or more fixing holes 3 for mounting the plate 2 to the body of the optical device 30(see FIG. 4) by set screws 15. Although the plate 2 is illustrated as being fixed to the body of the optical device via fixing hole 3 and set screw 15 in the drawing, the plate 2 can be mounted to the body of the device by any other suitable means well known in the art such as welding, bonding etc.

The base plate 2 is also provided with a first through hole 9 positioned in one of the vertical sides and a second through hole or guide hole 10 positioned in one of the horizontal sides of the plate 2 for receiving each of control screw 11 and 12, respectively, as shown in the drawing. The through hole 9 has inner threads which mate the outer thread of screw 11 for providing the forward and backward movement of the screw 11 when turning the screw in through hole 9. The through hole 10 or guide hole has a relatively large diameter through which a conventional tool such as a screw driver can pass to adjust the control screw 12 which is located in screw hole 16 located in one side of the carrier 6 as described herein below.

The control screws 11 and 12 have flat heads, i.e., the diameter of the head of each screw 11 and 12 is same as that of the body of the screw so that screws 11 and 12 pass the through holes 9 and 10 entirely along their length, and thus can effect the desired control of a photodetector 13 as described in more detail below. The length of the screw 12 is confined such that it does not reside in the hole 10, thus not prohibiting the movement of a carrier 6 in the hollow section of the base plate 2 when the screw 11 is turned to control the position of the photodetector 13.

The mount 1 of the present invention is also provided with a carrier 6 in the form of a cornered strip that is positioned in the hollow section of the base plate 2 as shown in FIG. 3. It is desirable in that the hollow section of the plate 2 is provided in the middle part of the plate 2 as is best known from FIG. 3 and formed by punching out the unnecessary portion of the base plate 2. The end of the carrier 6 is coupled to the base plate 2 via first neck 7 and the carrier extends in and around the hollow section of the base plate 2. The carrier 6 is bent in the hollow section of plate 2 at least three times so that it forms an opened angular loop which partially encircles the photodetector 13. It is preferable that the carrier 6 has the shape which can provide double cantilever for the photodetector 13 so that the position of the photodetector can be controlled in two directions. The other end of the carrier 6 is coupled to a support plate 14 via second neck 8. The second neck 8 is extended from the end of the carrier 6 in normal direction so that the support plate 14 forms right angle to the end of the carrier. By forming the carrier 6 and first neck and second neck 7 and 8 as described above, an elongated strip is formed on either sides of the carrier 6 and necks 7 and 8. The slot provides clearance for the photodetector when the photodetector is moved by the control of the screws 11 and 12. In a preferred embodiment of the invention, it is desirable that the base plate 2, carrier 6 and necks 7 and 8 have some degree of resiliency so that the carrier 6 and necks 7 and 8 maintain original setting position when they are in free state without the influence of the control screws 11 and 12.

The support plate 14 is illustrated in the form of square plate, but other types also can be used for carrying the photodetector 13. The photodetector 13 is attached to the support plate 14 by the method well known in the art. However, it is desirable that the photodetector 13 is integrated with the support plate 14 upon formation so that the position of the photodetector cannot be changed by the severe conditions encountered during the time when or after the photodetector 13 is fixed to the optical device.

Figure 4:
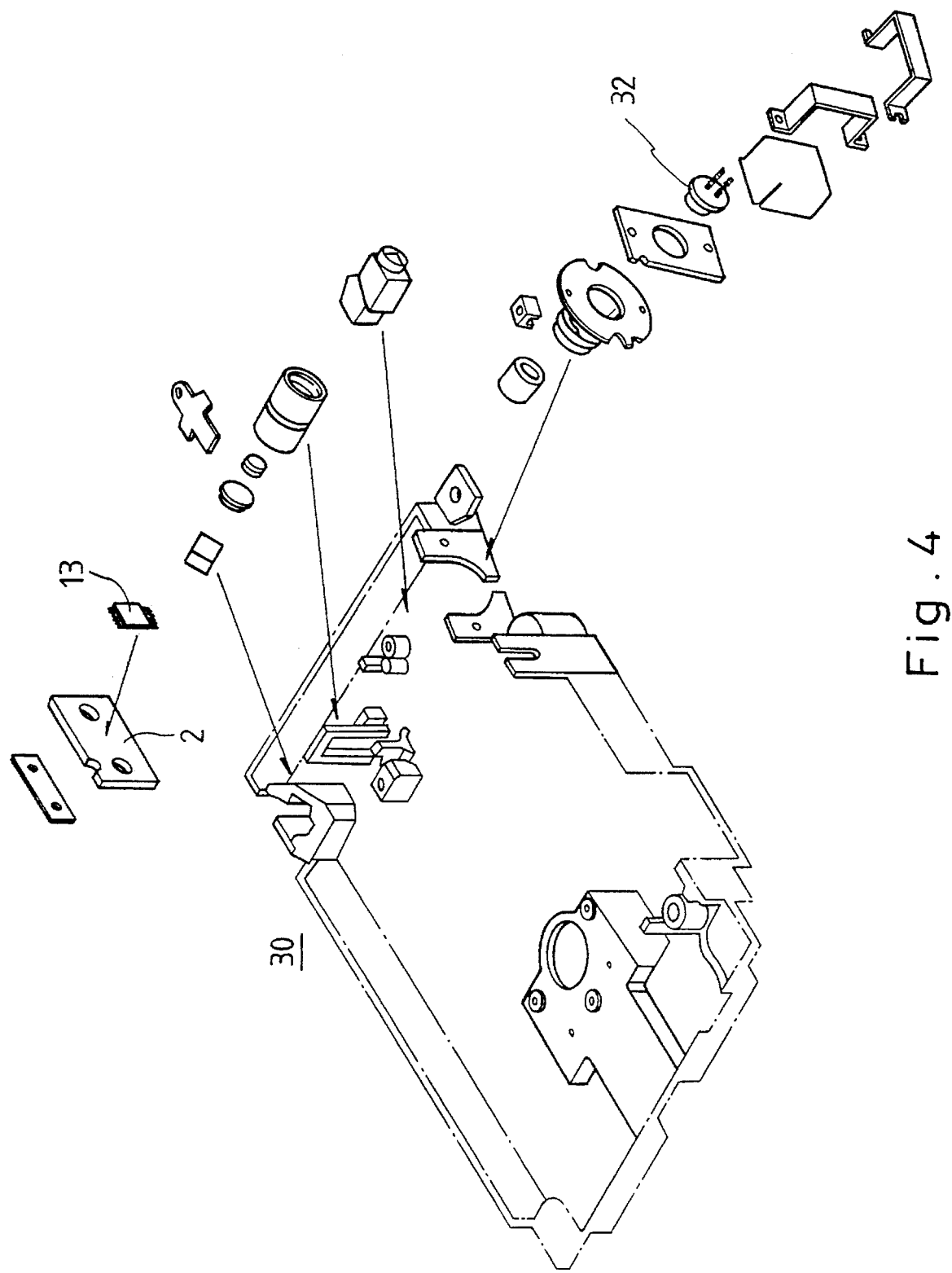
FIG. 4 is an exploded view of optical apparatus to which the mount of the invention for positioning the photodetector is applied.

The operation required to control the position of the photodetector 13 will be explained below with reference to FIG. 3 and FIG. 4. FIG. 4 shows the exploded view of the typical optical device 30 in which the mount 1 of the present invention is applied. When the base plate 2 is being fixed to the body of the optical device 30 using the set screws 15, it is desirable that the photodetector 13 is maintained in free state, i.e., the position of the photodetector 13 is determined by the tension of the carrier 6 without the aids of the control screws 11 and 12. During the process for aligning the photodetector 13, it is preferable that the center of the photodetector 13 is somewhat offset toward the control screw 11 and 12 since the screw 11 and 12 cannot draw the carrier 6 in their own directions. If the position of the photodetector 13 is misaligned in the horizontal direction, the screw 11 is turned by using normal tools. When the screw 11 is turned, the end of the screw 11 contacts the longitudinal side of the carrier 6 and biases the carrier 6 toward the direction opposite to that of the screw 11 around the first neck 7. Since the screw 12 is not located in the through hole 10 as mentioned above, the screw 12 is also moved together with the carrier 6 and thus does not obstruct the movement of the carrier 6. If it is required for the carrier 6 to move toward left as viewed in the drawings, then turning the screw 11 to the direction for the purpose of applying backward movement to the screw 11 will suffice to move the carrier 6 toward the left as viewed in the drawings. When it is required to move the photodetector 13 upwardly, one can rotate the control screw 12 via through hole 10 to advance the screw 12 in the screw hole 16. The end of the screw 11 contacts the lower side of the support plate 14 and biases it toward upward direction around the second neck 8. As can be seen from the drawings, the movement of the photodetector 13 is performed by using the first neck 7 and second neck 8 as a pivot. Therefore, each neck 7 and 8 provides the carrier 6 and/or photodetector 13 as a horizontal cantilever and vertical cantilever so that the carrier 6 and/or photodetector 13 can be swung around the first neck 7 and second neck 8, respectively.

After the mount 1 is installed as described above, a laser scanned from a laser diode 32 of the optical instrument 30 shown in FIG. 4 passes through a collimator, an expansion prism, mirror prism and objective lens, and is reflected by an optical disk. The laser reflected from the optical disk carries certain information obtained from the optical disk and again passes through the objective lens, mirror prism, expansion prism, return path lens and beam splitter. The laser passed through the beam splitter finally reaches the photodetector 13. In a typical optical device 30, a pair of photodetector 13 is provided for reading the information entrained in the laser. One of the photodetectors 13 is located in front of the focus of the laser, and the other is located in back of the focus of the laser for interpreting the data carried by the laser more precisely. The general parts of the optical device 30 are not relevant to the essential scope of the invention. Therefore, the detailed description of the construction and function of the optical device 30 illustrated in FIG. 4 will be omitted. The laser is finally focused on the photodetector via a return path as described above, and at this time a center line error in X and Y axis directions of the magnitude of about ±5 microns respectively can occur between a light center and a detector center. In case where the error occurs as described above, the error can be fine adjusted by the process discussed above in order to make the light center and the detector center coincide with each other.

Since the adjustment of the position of the photodetector 13 is carried out by the function of the cantilever caused by the necks 7 and 8, the range of the displacement of the photodetector is not exactly same as that of the control screws 11 and 12. The range of the displacement depends on the diameter and pitch of the control screws 11 and 12.

In the present invention, parameters which depend on the size of the set screws are as shown in Tables 1 and 2 below.

TABLE 1

| | Design parameters for each size of set screw (in case of Y-travel) | | | | | | | | | | | |
|---|---|---|---|---|---|---|---|---|---|---|---|---|
| Set Screw (Dia. × Pitch | T(max) [N.s] | F(max) [N] | F(oper) [N] | $X_a$ [mm] | $X_d$ [mm] | $X_f$ [mm] | Depth b [mm] | Width h [mm] | $Y_a$[max] [μm] | Stiffness [N/μm] | Max Cend Stress [Kpsi] | Sensitivity [μm/deg] |
| m 1.0 × 0.25 | 0.2813 | 723 | 3.5 | 1.75 | 4.75 | 7.00 | 1.50 | 0.60 | 76.65 | 0.46 | 29.6 | 0.441 |
| m 1.2 × 0.25 | 0.3375 | 752 | 3.5 | 1.75 | 4.75 | 7.00 | 1.50 | 0.60 | 76.65 | 0.46 | 29.6 | 0.441 |
| m 1.4 × 0.3 | 0.3938 | 748 | 3.5 | 1.75 | 4.75 | 7.00 | 1.50 | 0.60 | 76.65 | 0.46 | 29.6 | 0.529 |
| m 1.6 × 0.35 | 0.45 | 745 | 3.5 | 1.75 | 4.75 | 7.00 | 1.50 | 0.60 | 76.65 | 0.46 | 29.6 | 0.617 |

TABLE 2

| | Design parameters for each size of set screw (in case of X-travel) | | | | | | | | | | | |
|---|---|---|---|---|---|---|---|---|---|---|---|---|
| Set Screw (Dia. × Pitch | T(max) [N.s] | F(max) [N] | F(oper) [N] | $X_a$ [mm] | $X_d$ [mm] | $X_f$ [mm] | Depth b [mm] | Width h [mm] | $Y_a$[max] [μm] | Stiffness [N/μm] | Max Cend Stress [Kpsi] | Sensitivity [μm/deg] |
| m 1.0 × 0.25 | 0.2813 | 723 | 1.6 | 1.75 | 7.00 | 11.5 | 1.50 | 0.55 | 123.89 | 0.013 | 29.6 | 0.401 |
| m 1.2 × 0.25 | 0.3375 | 752 | 1.6 | 1.75 | 7.00 | 11.5 | 1.50 | 0.55 | 123.89 | 0.013 | 29.6 | 0.401 |
| m 1.4 × 0.3 | 0.3938 | 748 | 1.9 | 1.75 | 7.00 | 11.5 | 1.50 | 0.60 | 113.32 | 0.017 | 29.9 | 0.481 |
| m 1.6 × 0.35 | 0.45 | 745 | 1.6 | 1.75 | 7.00 | 22.5 | 1.50 | 0.55 | 123.89 | 0.013 | 29.6 | 0.561 |

As described above, the mount 1 of the present invention can not only have better assembly capability, but can also have a variety of larger design possibilities because the mount 1 can have large tolerance at the time of the assembly of related optical parts. Since the mount 1 can provide a larger range of adjustment in comparison with the conventional methods, the control range which can be carried out by the mount 1 of the present invention is about ±70 microns in both the X and Y axis of the optical axes of the laser when a center of optical axis does not coincide with the photodetector center.

In addition, the mount 1 according to the present invention has several advantages. Namely, the fine adjustment of the position of the photodetector 13 is possible by handling the control screws 11 and 12 without using an expensive special jig even after the assembly of the mount to the base plate, and said adjustment can be carried out at the same time or after the mount 1 is being fixed to the body of the optical device.

Although the present invention has been disclosed and illustrated with reference to particular embodiments illustrated in the drawings, the principles involved in the present invention are susceptible for use in numerous other embodiments which will be apparent to persons skilled in the art. The invention is, therefore, to be limited only as defined by the scope of the appended claims.

What is claimed is:

1. A double cantilever type mount for adjusting the position of a photodetector used in an optical device, comprising:

a base plate having a hollow section on the middle part thereof and being mounted to the body of the optical device, said base plate also having a screw hole positioned in a first side thereof and a guide hole positioned in a second side thereof normal to said first side;

a carrier which is in the form of an open loop-type strip and located in and around said hollow section of the base plate;

a support plate which supports the photodetector in the inside of the carrier;

a first neck which interconnects the support plate which carries the photodetector to the inner end of the carrier;

a second neck interconnecting the outer end of the carrier to the base plate of the mount, said carrier being provided with a screw hole formed in a position which is normal to the first neck and is opposite to the second neck; and a pair of screws for controlling the position of the carrier in the direction parallel to the first neck and second neck, respectively, each of said screws having a flat head with the same diameter as that of the shank of the screw.

2. The mount for adjusting the position of a photodetector as claimed in claim 1, wherein said carrier is bent at least three times so that it can have three angle corners.

3. The mount for adjusting the position of a photodetector as claimed in claim 1, wherein one of said screws is positioned in the screw hole of the base plate and is moved in forward and backward directions by rotation around its axis.

4. The mount for adjusting the position of a photodetector as claimed in claim 1, wherein one of said screws is positioned in the screw hole of the carrier, is moved in forward and backward directions by rotation around its axis, and has a length so that it does not remain in the guide hole of the base plate when it contacts the side of the support plate and thus said screw does not prevent the movement of the carrier during the process of adjusting the position of the photodetector.

5. The mount for adjusting the position of a photodetector as claimed in claim 1, wherein said guide hole provided in the base plate has relatively large diameter to allow handling of one of said pair of screws positioned in the screw hole of the carrier via said guide hole.

* * * * *